United States Patent
Wu et al.

(10) Patent No.: US 12,495,358 B2
(45) Date of Patent: Dec. 9, 2025

(54) WAKE UP PROCEDURE FOR HIBERNATING CELL

(71) Applicant: Nokia Technologies Oy, Espoo (FI)

(72) Inventors: Dawei Wu, Beijing (CN); Lei Su, Beijing (CN); Jari Olavi Lindholm, Espoo (FI)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 18/262,040

(22) PCT Filed: Jan. 25, 2021

(86) PCT No.: PCT/CN2021/073597
§ 371 (c)(1),
(2) Date: Jul. 19, 2023

(87) PCT Pub. No.: WO2022/155958
PCT Pub. Date: Jul. 28, 2022

(65) Prior Publication Data
US 2024/0098634 A1 Mar. 21, 2024

(51) Int. Cl.
*H04W 4/00* (2018.01)
*H04W 52/02* (2009.01)
*H04W 56/00* (2009.01)

(52) U.S. Cl.
CPC ..... *H04W 52/0206* (2013.01); *H04W 56/001* (2013.01)

(58) Field of Classification Search
CPC ...... G16H 80/00; G16H 10/20; H04L 5/0055; H04L 1/08; H04L 1/1822; H04L 1/1642;
(Continued)

(56) References Cited

U.S. PATENT DOCUMENTS 9,344,932 B2 5/2016 Jung et al.
9,781,639 B2 10/2017 Nory et al.
(Continued)

FOREIGN PATENT DOCUMENTS

CN 101820653 A 9/2010
EP 2416608 A1 2/2012
(Continued)

OTHER PUBLICATIONS

"5G's Waveform Is a Battery Vampire", IEEE Spectrum, Retrieved on Aug. 14, 2023, Webpage available at : https://spectrum.ieee.org/5gs-waveform-is-a-battery-vampire#toggle-gdpr.
(Continued)

*Primary Examiner* — Phuoc H Doan
(74) *Attorney, Agent, or Firm* — Barta Jones, PLLC

(57) ABSTRACT

Embodiments of the present disclosure relate to devices, methods, apparatuses and computer readable storage media of a wake up procedure for a hibernating cell. The method comprises determining whether configuration information for transmitting a wake up signal is received from a second device, the wake up signal used for waking up the second device in a hibernation mode; in accordance with a determination that the configuration information is missed, obtaining one or more reference parameters associated with the wake up signal; and transmitting the wake up signal to the second device based on the one or more reference parameters. In this way, a hibernating network could be waked up and provide service at any time when the UE requires the network service. The requirement for reducing power consumption of 5G site can be realized and meanwhile the service to be provided to the UE is not downgraded.

12 Claims, 3 Drawing Sheets

(58) Field of Classification Search
CPC ............ H04L 12/189; H04W 74/0833; H04W 52/0206; H04W 4/029; G01C 21/005; A61B 5/0022
See application file for complete search history.

(56) References Cited

U.S. PATENT DOCUMENTS

2014/0003312 A1* 1/2014 Sergeyev .......... H04W 52/0245
370/311
2019/0312711 A1* 10/2019 Stern-Berkowitz ..........................
H04L 1/1642

FOREIGN PATENT DOCUMENTS

| EP | 2523507 A1 | 11/2012 |
| WO | 2014/007938 A2 | 1/2014 |
| WO | 2015/018042 A1 | 2/2015 |
| WO | 2017/068305 A1 | 4/2017 |
| WO | 2018/175760 A1 | 9/2018 |

OTHER PUBLICATIONS

"3rd Generation Partnership Project; Technical Specification Group Radio Access Network; NR; Base Station (BS) radio transmission and reception (Release 16)", 3GPP TS 38.104 V16.5.0, Sep. 2020, pp. 1-277.

"IEEE Standard for a Precision Clock Synchronization Protocol for Networked Measurement and Control Systems", IEEE Instrumentation and Measurement Society, IEEE Std 1588TM-2008, Jul. 24, 2008, 289 pages.

Debaillie et al., "A Flexible and Future-Proof Power Model for Cellular Base Stations", IEEE 81st Vehicular Technology Conference (VTC Spring), May 11-14, 2015, 7 pages.

International Search Report and Written Opinion received for corresponding Patent Cooperation Treaty Application No. PCT/CN2021/073597, dated Oct. 22, 2021, 9 pages.

* cited by examiner

WAKE UP PROCEDURE FOR HIBERNATING CELL

RELATED APPLICATION

This application was originally filed as a Patent Cooperation Treaty Application No. PCT/CN2021/073597 filed on Jan. 25, 2021, which is incorporated herein by reference in its entirety.

FIELD

Embodiments of the present disclosure generally relate to the field of telecommunication and in particular to devices, methods, apparatuses and computer readable storage media of a wake up procedure for a hibernating cell.

BACKGROUND

New Radio (NR) is the 5th generation mobile network. It is a new global wireless standard after 1G, 2G, 3G, and 4G networks. 5G enables a new kind of network that is designed to connect virtually everyone and everything together including machines, objects, and devices. 5G wireless technology is meant to deliver higher multi-Gbps peak data speeds, ultra-low latency, more reliability, massive network capacity, increased availability, and a more uniform user experience to more users. Higher performance and improved efficiency empower new user experiences and connects new industries.

Since more and more 5G sites are constructed or in construction and more and more 5G terminal devices will be used, more energy will be consumed and therefore the energy usage will be exponentially increased in 5G era.

SUMMARY

In general, example embodiments of the present disclosure provide a solution of a wake up procedure for a hibernating cell.

In a first aspect, there is provided a first device. The first device comprises at least one processor; and at least one memory including computer program codes; the at least one memory and the computer program codes are configured to, with the at least one processor, cause the first device at least to determine whether configuration information for transmitting a wake up signal is received from a second device, the wake up signal used for waking up the second device in a hibernation mode; in accordance with a determination that the configuration information is missed, obtain one or more reference parameters associated with the wake up signal; and transmit the wake up signal to the second device based on the one or more reference parameters.

In a second aspect, there is provided a second device. The second device comprises at least one processor; and at least one memory including computer program codes; the at least one memory and the computer program codes are configured to, with the at least one processor, cause the second device at least to obtain one or more reference parameters associated with a wake up signal used for waking up the second device in a hibernation mode; and monitor the wake up signal transmitted from the first device based on the one or more reference parameters.

In a third aspect, there is provided a method. The method comprises determining whether configuration information for transmitting a wake up signal is received from a second device, the wake up signal used for waking up the second device in a hibernation mode; in accordance with a determination that the configuration information is missed, obtaining one or more reference parameters associated with the wake up signal; and transmitting the wake up signal to the second device based on the one or more reference parameters.

In a fourth aspect, there is provided a method. The method comprises obtaining one or more reference parameters associated with a wake up signal used for waking up the second device in a hibernation mode; and monitoring the wake up signal transmitted from the first device based on the one or more reference parameters.

In a fifth aspect, there is provided an apparatus comprising means for determining whether configuration information for transmitting a wake up signal is received from a second device, the wake up signal used for waking up the second device in a hibernation mode; means for in accordance with a determination that the configuration information is missed, obtaining one or more reference parameters associated with the wake up signal; and means for transmitting the wake up signal to the second device based on the one or more reference parameters.

In a sixth aspect, there is provided an apparatus comprising means for means for obtaining one or more reference parameters associated with a wake up signal used for waking up the second device in a hibernation mode; and means for monitoring the wake up signal transmitted from the first device based on the one or more reference parameters.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
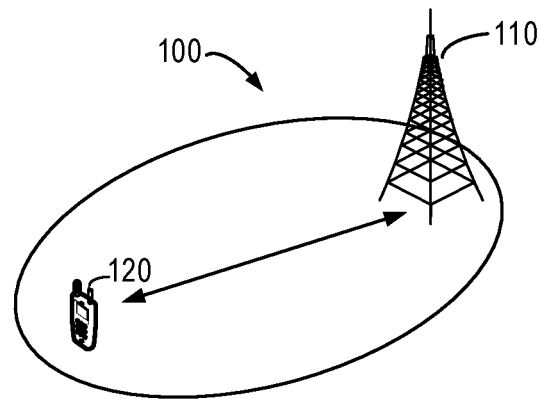
FIG. 1 illustrates an example communication network 100 in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 includes a terminal device 110 (hereinafter may also be referred to as a first device 110 or a UE 110. The communication network 100 may comprise a network device 120 (hereinafter may also be referred to as a second device 120 or a gNB 120). The network device 120 may communicate with the terminal device 110.

It is to be understood that the number of terminal devices and network devices are only for the purpose of illustration without suggesting any limitations. The communication network 100 may include any suitable number of terminal devices adapted for implementing embodiments of the present disclosure.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As described above, with the development of 5G, more and more 5G sites are constructed or in construction and more and more 5G terminal devices will be used. A 5G base station is generally expected to consume roughly three times as much power as a 4G base station. Moreover, with the significant growth in the number of small cells, massive Multiple-Input Multiple-Output (mMIMO), cloud computing and Internet-connected devices, more 5G base station are required for covering the same area.

In network side, power consumption of the Remote Radio Unit (RRU)/Active Antenna Unit (AAU) is the main reason for the increasing power usage. The increase of network side energy consumption means that the Operating Expense (OPEX) for the operator will be significantly higher. In this situation, the power supply devices need to be updated for the increasing power consumption which means the Capital Expenditure (CAPEX) of the operator will increase as well.

It has been proposed that the 5G site can be shut down and switch to a hibernating mode when no UE needs to be served by the 5G site. When the UE requires the network service, the hibernating 5G site can be waked up by the UE.

However, an out-of-service site will bring great inconvenience to UE's clock synchronization and location update as well. If a cell is hibernating, a non-stationary UE, which is in an idle mode, may not synchronize to the cell. Meanwhile, the UE cannot determine if this UE is still in the coverage area of the current cell or if it has moved to the coverage area of another cell that is also hibernating. It is also possible that the UE has moved to a different tracking area.

For example, in the scenario shown in FIG. 1, the gNB 120 can switch from an active mode to a hibernating mode when no network service is required by the UE 110. However, when the gNB 120 is in a hibernating mode, the gNB 120 may not receive the request transmitted from the UE 110 effectively if a network service is required by the UE 110.

Furthermore, if the gNB 120 is in a hibernating mode and the UE 110 has moved in the coverage of the gNB 120 from another cell, the UE 110 may need the paging information from the gNB 120. However, the paging information may not be received due to the hibernating state of the gNB 120.

An approach for the site hibernation and wake up may be based on the prior experience. That is, the possible time points when no UEs need the network service and the possible time points when the UEs may require the network again can be summarized and analysed from the history data and therefore a rule for the site hibernate and wake up can be determined. But this approach cannot be very accurate since the UE may need service anytime. Actually, there is not any such rule that could define a 100% accurate hibernation and wake up time.

Another approach proposes that only some of the sites can switch to a hibernating mode. For example, certain frequency layer or AI optimised small cells via separated data and control planes, such as using Particle Swarm Optimization, where a Marco cell can be intelligently deactivate or activate small cells according to the number of UEs in the coverage area of the small cell. Unfortunately, the full power saving potential cannot be achieved with these methods and meanwhile more radio resources or implementation cost may be needed.

It has been proposed that a wake-up signal can be received by the eNB on a Random Access Channel (RACH). The transmission parameters of the wake-up signal can be provided by the cell, such as a home gNB, and these parameters can only allow to be used in current cell. Therefore, the UE needs to stay in the coverage area of the cell. The UE cannot wake up a cell at which the UE has not resided before since the UE cannot obtain related information for waking up the cell.

Therefore, the present disclosure provides solutions of wake up procedure for a hibernating cell. In this solution, if the UE requires the network service from the gNB and the configuration information for transmitting the wake up signal to the gNB is missed, the UE may obtain one or more reference parameters and transmit the wake up signal based on the one or more parameters. In this way, a hibernating network could be waked up and provide service at any time when the UE requires the network service. The requirement for reducing power consumption of 5G site can be realized and meanwhile the service to be provided to the UE is not downgraded.

Principle and implementations of the present disclosure will be described in detail as below with reference to FIG. 2, which shows a schematic process of a wake up procedure for a hibernating cell. For the purpose of discussion, the process 200 will be described with reference to FIG. 1. The process 200 may involve the UE 110 and the gNB 120 as illustrated in FIG. 1.

Figure 2:
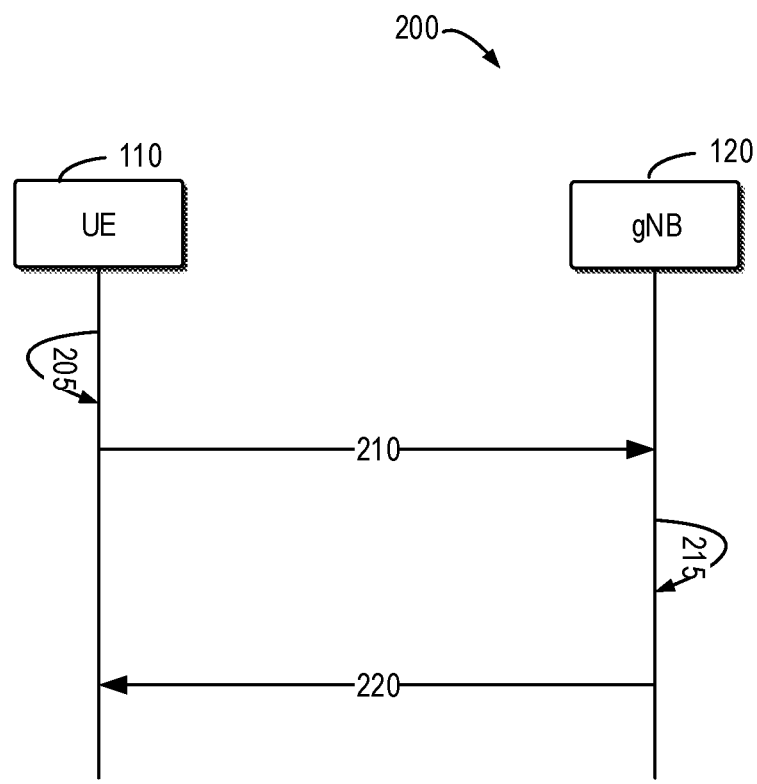
FIG. 2 shows a signaling chart illustrating a process of a wake up procedure for a hibernating cell according to some example embodiments of the present disclosure.

As shown in FIG. 2, if the UE 110 requires the network service from the gNB 120 in a hibernating mode, the UE 110 may try to transmit a wake up signal to the gNB 120. For transmitting the wake up signal, the UE 110 may determine whether configuration information of the wake up signal has been received from the gNB 120, for example, via system information transmitted from the gNB 120. If the UE 110 determines that such configuration information is missed, the UE 110 may obtain 205 one or more corresponding reference parameters associated with the wake up signal.

In some example embodiments, one or more corresponding reference parameters associated with the wake up signal may comprise time information about a transmission of the wake up signal. For example, the corresponding reference parameter can comprise a time point at which the wake up signal is to be transmitted. The corresponding reference parameter can also comprise a time period for transmitting the wake up signal.

Furthermore, the corresponding reference parameter can comprise a frequency point at which the wake up signal is to be transmitted. For example, one or more specific frequency point(s) within each NR operation band can be defined. The potential wake-up signal shall be sent at these specific frequency points. The number of frequency points that needs to be defined depends on the width of different bands. For example, in FR1, it may be enough to specify only one point if the bandwidth is within 100 MHz since normally NR radio could support 100 MHz bandwidth. More points may be needed when bandwidths are several hundred MHz.

In some example embodiments, such reference parameters can be preconfigured by an operator supporting a communication between the UE 110 and the gNB 120. The reference parameters can also be preconfigured based on the country or region. Such reference parameters can be updated when the UE 110 is connected to internet and can access the server where the parameters are stored.

In some example embodiments, such reference parameters can also be predefined in the specification directly.

If the UE 110 obtains one or more reference parameters from both the operator and the specification. The UE 110 may use a set of reference parameters preconfigured by the operator to generate the wake up signal.

Based on the obtained reference parameters associated with the wake up signal, the UE 110 may generate a wake up signal and transmit 210 the wake up signal to the gNB 120.

The order for transmitting the wake up signal could be same as the order used in cell search procedure, which is, first transmit the wake up signal at the band the UE 110 had resided at the last time, then transmit the signal at each band the UE supports. After a wake up signal is transmitted for a band, the UE 110 shall wait for MIB/SIB transmission recovery and search this band first using legacy cell search procedure, then turn to next band and do the same procedure in each supported band.

In some example embodiments, the wake up signal can be transmitted to the gNB 120 in a form of RACH-like signal which is typically transmitted without a valid timing advance. As another option, the wake up signal can be transmitted in a form of Physical Uplink Control Channel (PUCCH)/Scheduling Request (SR)-like signal.

When the wake-up signal is transmitted, there are no other uplink transmissions in the cell. This means that interference from the wake-up signal can be ignored and an accurate timing advance of the wake-up signal may not be required. For example, the estimate of the timing advance could be calculated based on the locations of the UE 110 and the gNB serving the UE 110. The location of UE 110 can be determined, for example based on the Global Navigation Satellite System (GNSS). The location of gNB serving the UE 110 can be provided to the UE by signalling, for example, via in the form of coverage map received from a location server. With the timing advance, the UE 110 may transmit the wake up signal to the gNB 120 in a form of PUCCH/SR-like signal.

As mentioned above, the trigger for the UE 110 to transmit the wake up signal can be the mobility of the UE 110. When the UE 110 moves, the UE 110 needs to know its location and determine whether the UE 110 has moved away from the current serving cell. The location of the UE 110 can be determined based on the GNSS or Wi-Fi. Meanwhile, the coverage areas of the cells can be provided to the UE by a location server, for example, by means of a map application. Furthermore, the information of the tracking areas may also need to be provided to the UE 110, if the UE 110 moves to a new tracking area or the tracking area update timer T3412 expires, the UE 110 may transmit a wake up signal so that the tracking update area procedure can be performed.

For example, if the UE 110 moves to a tracking area associated with the gNB 120 different from a previous tracking area at which the UE 110 is located and the gNB 120 is in a hibernating mode, the UE 110 may transmit the wake up signal to the gNB 120.

At the gNB 120 side, the gNB 120 may also obtain 215 one or more corresponding reference parameters associated with the wake up signal and receive the wake up signal based on the one or more corresponding reference parameters. Then the gNB 120 may resume the transmission from RRU and send SSB and minimum set of system information. For example, the gNB 120 may transmit 220 the system information to the UE 110.

In this way, a hibernating network could be waked up and provide service at any time when the UE requires the network service. The requirement for reducing power consumption of 5G site can be realized and meanwhile the service to be provided to the UE is not downgraded.

Figure 3:
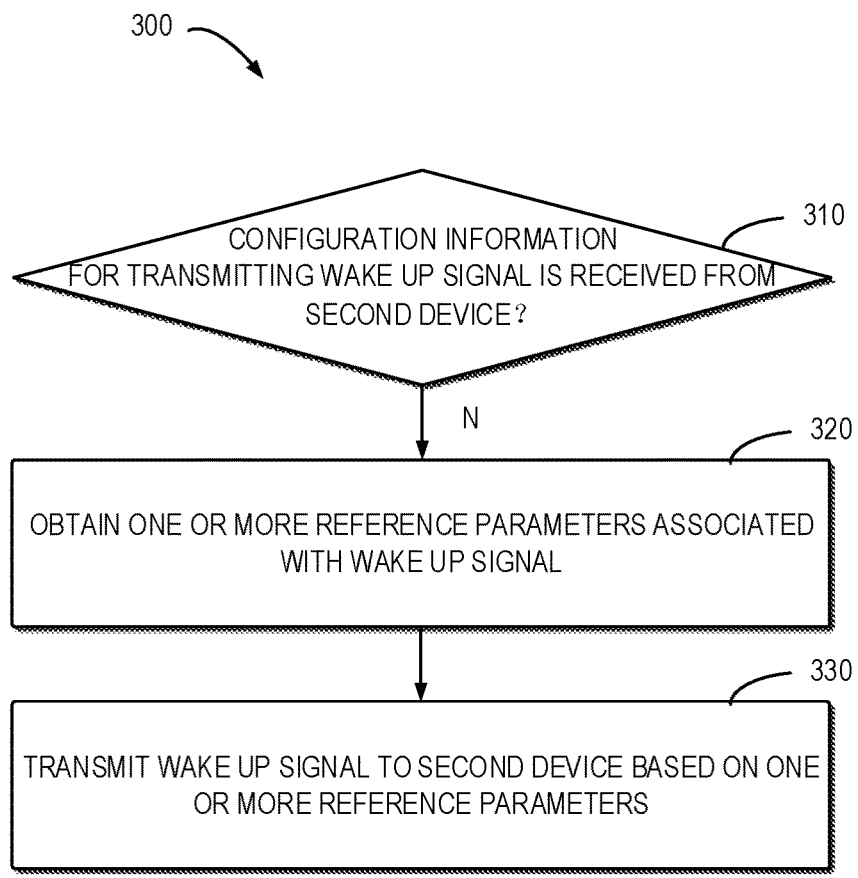
FIG. 3 shows a flowchart of an example method of a wake up procedure for a hibernating cell according to some example embodiments of the present disclosure.

FIG. 3 shows a flowchart of an example method 300 of a wake up procedure for a hibernating cell according to some example embodiments of the present disclosure. The method 300 can be implemented at the first device 110 as shown in FIG. 1. For the purpose of discussion, the method 300 will be described with reference to FIG. 1.

At 310, the first device determines whether configuration information for transmitting a wake up signal is received from a second device, the wake up signal used for waking up the second device in a hibernation mode.

In some example embodiments, the one or more reference parameters are preconfigured by an operator supporting a communication between the first and second devices.

In some example embodiments, the one or more reference parameters are predefined.

In some example embodiments, the one or more reference parameters comprise at least one of a time point when the wake up signal begins to be transmitted, a time period for transmitting the wake up signal and a frequency point at which the wake up signal is to be transmitted.

At 320, if the first device determines that the configuration information is missed, the first device obtain one or more reference parameters associated with the wake up signal.

At 330, the first device transmits the wake up signal to the second device based on the reference parameters.

In some example embodiments, if the first device determines that the first device moves to a reference location or a timer associated with a tracking area update procedure expires, the first device may obtain location information about the reference location. Then the first device may determine, based on the location information, whether the reference location belongs to a tracking area associated with the second device different from a previous tracking area at which the first device is located. If the first device determines that the reference location belongs to the tracking area associated with the second device, the first device may transmit the wake up signal to the second device.

In some example embodiments, the location information comprises at least one of a tracking area code associated with the reference location, an identifier of a cell associated with the reference location, a coverage geographic distribution of the reference location, and transmitting and receiving positions of the reference location.

In some example embodiments, the first device may determine a timing advance for transmitting the wake up signal from the first device to the second device based on its location and location of the second device and transmitting the wake up signal with the timing advance.

In some example embodiments, if the first device determines that the configuration information for transmitting the wake up signal is received from a second device, the first device may transmit the wake up signal.

In some example embodiments, if the first device determines that a first set of reference parameters and a second set of reference parameters are obtained, the first set of reference parameters are preconfigured by an operator supporting the communication between the first and second devices and the second set of reference parameters are predefined, the first device may generate the wake up signal based on the first set of reference parameters.

In some example embodiments, the first device comprises a terminal device and the second device comprises a network device.

Figure 4:
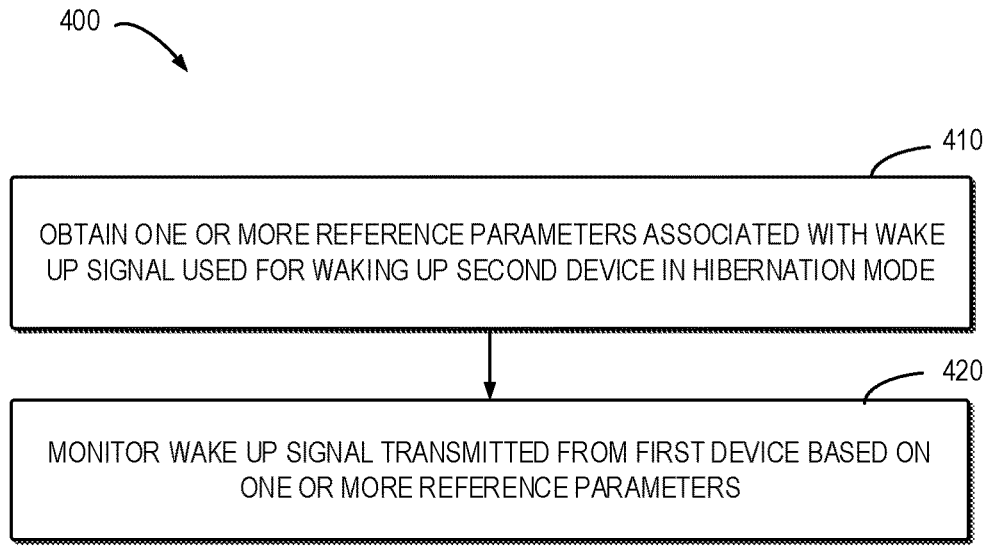
FIG. 4 shows a flowchart of an example method of a wake up procedure for a hibernating cell according to some example embodiments of the present disclosure.

FIG. 4 shows a flowchart of an example method 400 of a wake up procedure for a hibernating cell according to some example embodiments of the present disclosure. The method 400 can be implemented at the second device 120 as shown in FIG. 1. For the purpose of discussion, the method 400 will be described with reference to FIG. 1.

At 410, the second device obtains one or more reference parameters associated with a wake up signal used for waking up the second device in a hibernation mode.

In some example embodiments, the one or more reference parameters are preconfigured by an operator supporting a communication between the first and second devices.

In some example embodiments, the one or more reference parameters are predefined.

In some example embodiments, the one or more reference parameters comprise at least one of a time point when the wake up signal begins to be transmitted, a time period for transmitting the wake up signal and a frequency point at which the wake up signal is to be transmitted.

At 420, the second device monitors the wake up signal transmitted from the first device based on the one or more reference parameters.

In some example embodiments, the first device comprises a terminal device and the second device comprises a network device.

In some example embodiments, an apparatus capable of performing the method 300 (for example, implemented at the first device 110) may comprise means for performing the respective steps of the method 300. The means may be implemented in any suitable form. For example, the means may be implemented in a circuitry or software module.

In some example embodiments, the apparatus comprises means for determining whether configuration information for transmitting a wake up signal is received from a second device, the wake up signal used for waking up the second device in a hibernation mode; means for in accordance with a determination that the configuration information is missed, obtaining one or more reference parameters associated with the wake up signal; and means for transmitting the wake up signal to the second device based on the one or more reference parameters.

In some example embodiments, the one or more reference parameters are preconfigured by an operator supporting a communication between the first and second devices.

In some example embodiments, the one or more reference parameters are predefined.

In some example embodiments, the one or more reference parameters comprise at least one of a time point when the wake up signal begins to be transmitted, a time period for transmitting the wake up signal and a frequency point at which the wake up signal is to be transmitted.

In some example embodiments, the means for transmitting the wake up signal comprises means for in accordance with a determination that the first device moves to a reference location or a timer associated with a tracking area update procedure expires, obtaining location information about the reference location; means for determining, based on the location information, whether the reference location belongs to a tracking area associated with the second device different from a previous tracking area at which the first device is located; and means for in accordance with a determination that the reference location belongs to the tracking area associated with the second device, transmitting the wake up signal to the second device.

In some example embodiments, the location information comprises at least one of a tracking area code associated with the reference location, an identifier of a cell associated with the reference location, a coverage geographic distribution of the reference location, and transmitting and receiving positions of the reference location.

In some example embodiments, the means for transmitting the wake up signal comprises means for determining a timing advance for transmitting the wake up signal from the first device to the second device; and means for transmitting the wake up signal with the timing advance.

In some example embodiments, the apparatus further comprises means for in accordance with a determination that the configuration information is received, transmitting the wake up signal to the second device based on the configuration information.

In some example embodiments, the apparatus further comprises means for in accordance with a determination that a first set of reference parameters and a second set of reference parameters are obtained, the first set of reference parameters being preconfigured by an operator supporting the communication between the first and second devices and the second set of reference parameters being predefined, generating the wake up signal based on the first set of reference parameters.

In some example embodiments, the first device comprises a terminal device and the second device comprises a network device.

In some example embodiments, an apparatus capable of performing the method 400 (for example, implemented at the second device 120) may comprise means for performing the respective steps of the method 400. The means may be implemented in any suitable form. For example, the means may be implemented in a circuitry or software module.

In some example embodiments, the apparatus comprises means for means for obtaining one or more reference parameters associated with a wake up signal used for waking up the second device in a hibernation mode; and means for monitoring the wake up signal transmitted from the first device based on the one or more reference parameters.

In some example embodiments, the one or more reference parameters are preconfigured by an operator supporting a communication between the first and second devices.

In some example embodiments, the one or more reference parameters are predefined.

In some example embodiments, the one or more reference parameters comprise at least one of a time point when the wake up signal begins to be transmitted, a time period for transmitting the wake up signal and a frequency point at which the wake up signal is to be transmitted.

In some example embodiments, the first device comprises a terminal device and the second device comprises a network device.

Figure 5:
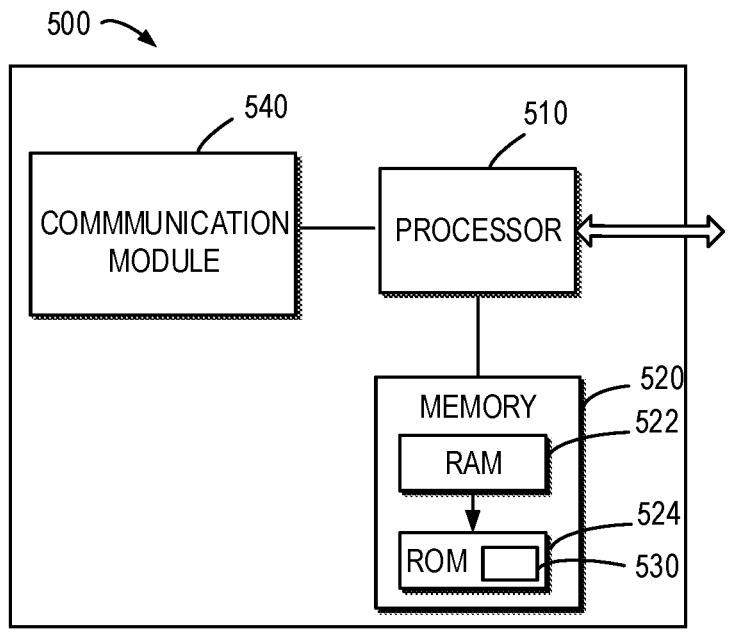
FIG. 5 shows a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the UE 110 or the gNB 120 as shown in FIG. 1. As shown, the device 500 includes one or more processors 510, one or more memories 520 coupled to the processor 510, and one or more transmitters and receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2-4. The embodiments of the present disclosure may also be implemented by hardware or by a combination of software and hardware.

Figure 6:
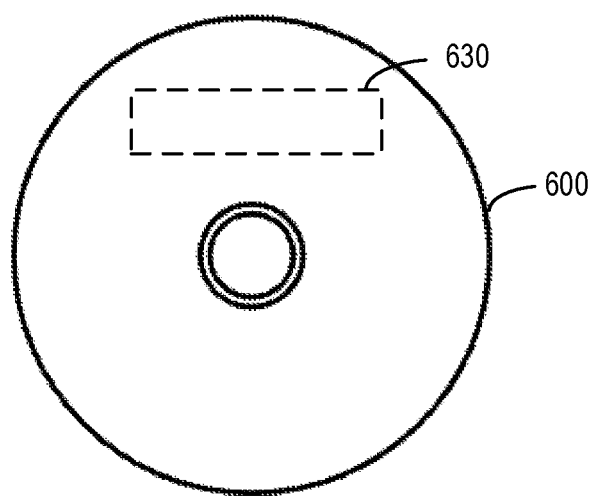
FIG. 6 shows a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program codes;
   the at least one memory and the computer program codes are configured to, with the at least one processor, cause the first device at least to:
   determine whether configuration information for transmitting a wake up signal is received from a second device, the wake up signal being used for waking up the second device in a hibernation mode;
   in accordance with a determination that the configuration information is missed, obtain one or more reference parameters associated with the wake up signal, wherein the one or more reference parameters comprise the following: a time point when the wake up signal begins to be transmitted, a time period for transmitting the wake up signal, and a frequency point at which the wake up signal is to be transmitted;
   in accordance with a determination that a first set of reference parameters and a second set of reference parameters are obtained, generate the wake up signal based on the first set of reference parameters, the first set of reference parameters being preconfigured by an operator supporting a communication between the first and second devices and the second set of reference parameters being predefined;
   transmit the wake up signal to the second device based on the reference parameters by:
     in accordance with a determination that the first device moves to a reference location and a timer associated with a tracking area update procedure expires, obtaining location information about the reference location;
     determining, based on the location information, the reference location belongs to a tracking area associated with the second device different from a previous tracking area at which the first device is located; and
     in accordance with a determination that the reference location belongs to the tracking area associated with the second device:
       determining a timing advance for transmitting the wake up signal from the first device to the second device; and
       transmitting the wake up signal with the timing advance to the second device.

2. The first device of claim 1, wherein the location information comprises the following: a tracking area code associated with the reference location, an identifier of a cell associated with the reference location, a coverage geographic distribution of the reference location, and transmitting and receiving positions of the reference location.

3. The first device of claim 2, wherein transmitting the wake up signal to the second device is further based on a determination that the configuration information is received.

4. The first device of claim 3, wherein the first device comprises a terminal device and the second device comprises a network device.

5. A system comprising:
   a first device;
   at least one processor; and
   at least one memory including computer program codes;
   the at least one memory and the computer program codes are configured to, with the at least one processor, cause the first device at least to:
   determine whether configuration information for transmitting a wake up signal is received from a second device, the wake up signal being used for waking up the second device in a hibernation mode;
   in accordance with a determination that the configuration information is missed, obtain one or more reference parameters associated with the wake up signal, wherein the one or more reference parameters comprise the following: a time point when the wake up signal begins to be transmitted, a time period for transmitting the wake up signal, and a frequency point at which the wake up signal is to be transmitted;

in accordance with a determination that a first set of reference parameters and a second set of reference parameters are obtained, generate the wake up signal based on the first set of reference parameters, the first set of reference parameters being preconfigured by an operator supporting a communication between the first and second devices and the second set of reference parameters being predefined;

transmit the wake up signal to the second device based on the reference parameters by:

in accordance with a determination that the first device moves to a reference location and a timer associated with a tracking area update procedure expires, obtaining location information about the reference location;

determining, based on the location information, the reference location belongs to a tracking area associated with the second device different from a previous tracking area at which the first device is located; and in accordance with a determination that the reference location belongs to the tracking area associated with the second device:

determining a timing advance for transmitting the wake up signal from the first device to the second device; and transmitting the wake up signal with the timing advance to the second device.

6. The first device of claim 5, wherein the location information comprises the following: a tracking area code associated with the reference location, an identifier of a cell associated with the reference location, a coverage geographic distribution of the reference location, and transmitting and receiving positions of the reference location.

7. The first device of claim 6, wherein transmitting the wake up signal to the second device is further based on a determination that the configuration information is received.

8. The first device of claim 7, wherein the first device comprises a terminal device and the second device comprises a network device.

9. A method comprising:

determining, by a first device, whether configuration information for transmitting a wake up signal is received from a second device, the wake up signal being used for waking up the second device in a hibernation mode;

in accordance with a determination that the configuration information is missed, obtaining, by the first device, one or more reference parameters associated with the wake up signal, wherein the one or more reference parameters comprise the following: a time point when the wake up signal begins to be transmitted, a time period for transmitting the wake up signal, and a frequency point at which the wake up signal is to be transmitted;

in accordance with a determination that a first set of reference parameters and a second set of reference parameters are obtained, generating, by the first device, the wake up signal based on the first set of reference parameters, the first set of reference parameters being preconfigured by an operator supporting a communication between the first and second devices and the second set of reference parameters being predefined;

transmitting, by the first device, the wake up signal to the second device based on the reference parameters by:

in accordance with a determination that the first device moves to a reference location and a timer associated with a tracking area update procedure expires, obtaining location information about the reference location;

determining, based on the location information, the reference location belongs to a tracking area associated with the second device different from a previous tracking area at which the first device is located; and in accordance with a determination that the reference location belongs to the tracking area associated with the second device:

determining a timing advance for transmitting the wake up signal from the first device to the second device; and transmitting the wake up signal with the timing advance to the second device.

10. The method of claim 9, wherein the location information comprises the following: a tracking area code associated with the reference location, an identifier of a cell associated with the reference location, a coverage geographic distribution of the reference location, and transmitting and receiving positions of the reference location.

11. The method of claim 10, wherein transmitting the wake up signal to the second device is further based on a determination that the configuration information is received.

12. The method of claim 11, wherein the first device comprises a terminal device and the second device comprises a network device.

* * * * *